US008463902B2

(12) United States Patent
Shafiee et al.

(10) Patent No.: US 8,463,902 B2
(45) Date of Patent: Jun. 11, 2013

(54) WORK UNIT ADAPTER FOR CONTENT PROCESSING WITH THIRD PARTY NETWORK ELEMENTS

(75) Inventors: Mohammad Reza Shafiee, Ridgefield, CT (US); Anurag Gupta, Lucknow (IN); Ashutosh K. Sureka, Irving, TX (US); Wei Liu, Flower Mound, TX (US); Gangadhar R. Gogineni, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 252 days.

(21) Appl. No.: 12/971,111

(22) Filed: Dec. 17, 2010

(65) Prior Publication Data

US 2012/0158946 A1 Jun. 21, 2012

(51) Int. Cl.
*G06F 15/173* (2006.01)
(52) U.S. Cl.
USPC ........... 709/224; 709/226; 709/246; 718/100; 718/104

(58) Field of Classification Search
USPC .................. 709/223–226, 245–246; 718/100, 718/102, 104
See application file for complete search history.

(56) References Cited

U.S. PATENT DOCUMENTS

| | | | |
|---|---|---|---|
| 6,115,640 A * | 9/2000 | Tarumi | 700/99 |
| 7,567,360 B2 * | 7/2009 | Takahashi et al. | 358/1.15 |
| 7,675,639 B2 * | 3/2010 | Shimizu | 358/1.14 |
| 2012/0159503 A1 * | 6/2012 | Shafiee et al. | 718/104 |

* cited by examiner

*Primary Examiner* — Bharat N Barot

(57) ABSTRACT

A method including receiving a work flow for the ingestion, transformation, and distribution of content, wherein the work flow includes one or more work unit tasks; retrieving work unit task information pertaining to the one or more work unit tasks; identifying one or more network elements to execute one of the one or more work unit tasks based on the work unit task information; translating the work unit task information from a format used by one or more devices to another format that is used by the one or more network elements based on one of an object adapter pattern or a class adapter pattern; and send the translated work unit task information to the one or more network elements.

20 Claims, 14 Drawing Sheets

WORK UNIT ADAPTER FOR CONTENT PROCESSING WITH THIRD PARTY NETWORK ELEMENTS

BACKGROUND

Consumer demand for media is increasing. For example, consumers often watch and/or listen to various media at home, while traveling, at work, etc. As a result, the number of communication channels for delivering media content and the number of different types of devices for playing the content has also increased.

DETAILED DESCRIPTION

Figure 1:
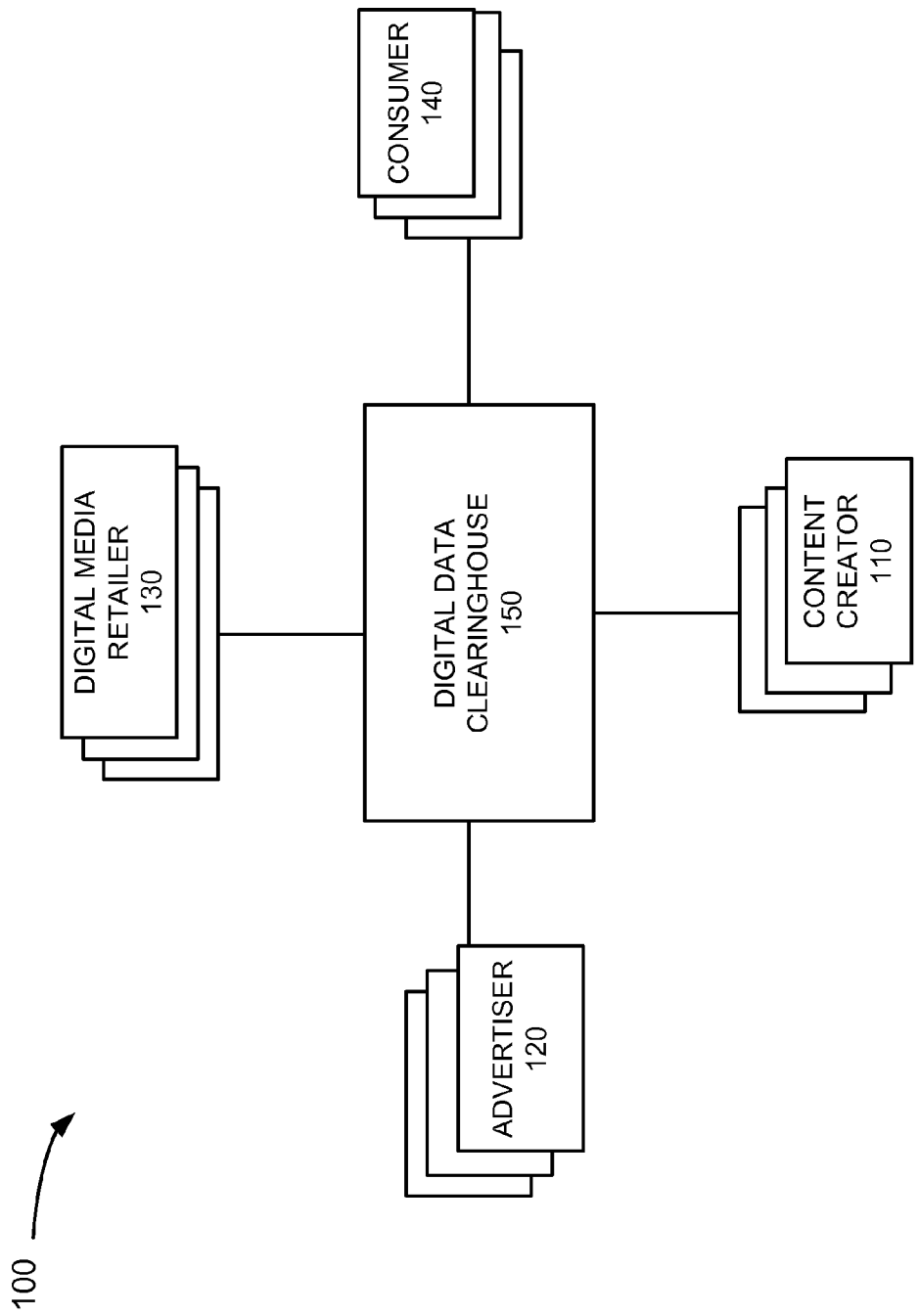
FIG. 1 is a diagram illustrating an exemplary network that includes a digital distribution clearinghouse (DDC) for processing content.

The following detailed description refers to the accompanying drawings. The same reference numbers in different drawings may identify the same or similar elements.

The term "content," as used herein, may include for example, multimedia content (e.g., text-based content, audio, and video such as a movie, a show, a television program, broadcast of a live event (e.g., sporting event, concert, etc.)), or another type of content or asset.

As described herein, a digital data clearinghouse (DDC) may allow a user to define or create work units, use these work units to compose a work flow and, to dynamically provide for customer-requested processes for content distribution. When the user submits a service order for processing content on behalf of a customer, the DDC may obtain, from the work flow associated with a work order, work unit tasks that correspond to the work units. The DDC may perform all or some of these tasks.

The term "work unit," as used herein, may refer to a description of a set of one or more operations that the DDC may perform pertaining to the ingestion, transformation, and distribution of content. For example, the transforming of content may include overlaying subtitles on a video, inserting advertisements into a video, transcoding content from one format to another format, etc. A further description of a work unit is provided below.

The term "work flow," as used herein, may refer to one or more work units that may be executed to fulfill a work flow task associated with a work order. For example, a work unit may include an input and an output to allow a series of work units to form a processing path through which content may flow.

The term "work order," as used herein, may refer to an order (e.g., associated with a customer) that is received for processing by the DDC. A work order may include a work flow, criteria for the selection of the content to be processed in the work flow, and the parameter values for the work units pertaining to the work flow. For example, the parameters may include system parameters that may not be changeable, default parameters that may be changeable, and default parameters that may require human intervention (e.g., user verification, user entry, etc.).

The term "work unit task," as used herein, may refer to particular function or operation that may be performed based on a work unit. A work unit may perform one or more work unit tasks.

According to an exemplary scenario, assume that a user (e.g., a DDC operator, a DDC administrator, etc.) defines two work units via the DDC. Also assume that the first work unit describes reformatting an M×N video into a 600×400 video, and the second work unit describes inserting an advertisement into the video. When a customer (e.g., a content creator, a content provider, etc.) places an order with the user to reformat the video into a 600×400 video and insert an advertisement in the video, the user may compose, through a graphical user interface (GUI) provided via the DDC, a work flow by concatenating two or more work units. When the user submits a work order, the DDC may schedule for execution a set of tasks that are associated with the work units included in the work flow. The DDC may then perform the tasks. The preceding example is provided for simplicity. Descriptions below provide additional details with respect to the DDC. In particular, a work flow command processing system will be described further below.

FIG. 1 is a diagram of an exemplary network 100 that includes a DDC for processing content. Referring to FIG. 1, network 100 includes one or more content creators 110, one or more advertisers 120, one or more digital media retailers (DMRs) 130, one or more consumers 140 and digital data clearinghouse (DDC) 150.

Content creator 110 (referred to collectively as content creators 110 or individually as content creator 110) may represent one or more creators of content that wish to package and/or distribute the content to other parties, such as consumers 140. For example, content creators 110 may include movie or television studios, music companies, publishers, game developers, parties who generate user-generated content (UGC), websites, blog sites, etc. Content creators 110 may provide content to DDC 150 for formatting (e.g., transcoding, etc.), packaging and/or distribution, as described further below.

Advertiser 120 (referred to collectively as advertisers 120 or individually as advertiser 120) may represent one or more parties that wish to insert advertising into content. For example, advertiser 120 may contract with a content creator 110 and/or digital media retailer 130 to insert an advertisement into a media stream provided to consumers 140. DDC 150 may insert the advertisement into the media stream in accordance with the agreement between the parties.

DMR 130 may represent one or more business entities that receive content from various parties and resell it to end users. For example, DMRs 130 may include broadcasters, cable companies, direct broadcast satellite (DBS) providers, Internet protocol television (IPTV) providers, mobile phone TV providers, online retailers, etc. DMRs 130 may receive content from DDC 150 and sell/provide the content to consumers 140.

Consumer 140 may represent one or more consumers 140 that receive content originally generated by or provided by content creators 110 and that has been processed by DDC 150. For example, DDC 150 may format and package the content for distribution by DMRs 130 and/or DDC 150 to consumers 140.

DDC 150 may include one or more devices (e.g., a server device, a computing device, etc.) for processing content. For example, as described above, DDC 150 may provide an automated environment in which content from content creators 110 is transformed and packaged for distribution in any number of formats, based on the particular requirements associated with DMRs 130. According to an exemplary embodiment, DDC 150 may also aggregate various data and insert advertisements into the content. DDC 150, consistent with embodiments described herein, may also utilize flexible work flows to streamline the formatting and packaging of content for digital distribution.

According to other embodiments, network 100 may include additional devices, fewer devices, different devices, and/or a different configuration than those illustrated in FIG. 1. For example, network 100 may include a large number (e.g., hundreds or thousands) of different types of user device associated with consumers 140, such as, for example, televisions, cellular phones, computers (e.g., laptops, desktops, tablets, notebooks, netbooks, etc.), personal digital assistants (PDAs), etc. Additionally, or alternatively, according to other exemplary embodiments, network 100 may include additional DDCs 150, etc. Additionally, or alternatively, network 100 may include one or more networks of various types to interconnect the devices illustrated in FIG. 1 and enable the devices to communicate with one another. For example, network 100 may include a public switched telephone network (PSTN), a local area network (LAN), a wide area network (WAN), the Internet, an intranet, or some other type of network. Network 110 may include wired connections and/or wireless connections among the devices illustrated.

Also, according to other embodiments, one or more functions and/or processes described as being performed by a particular device or component may be performed by a different device or component, or some combination of devices or components. Additionally, or alternatively, according to other embodiments, one or more functions and/or processes described as being performed by multiple devices or multiple components may be performed by different devices or components, or a single device, etc.

Figure 2:
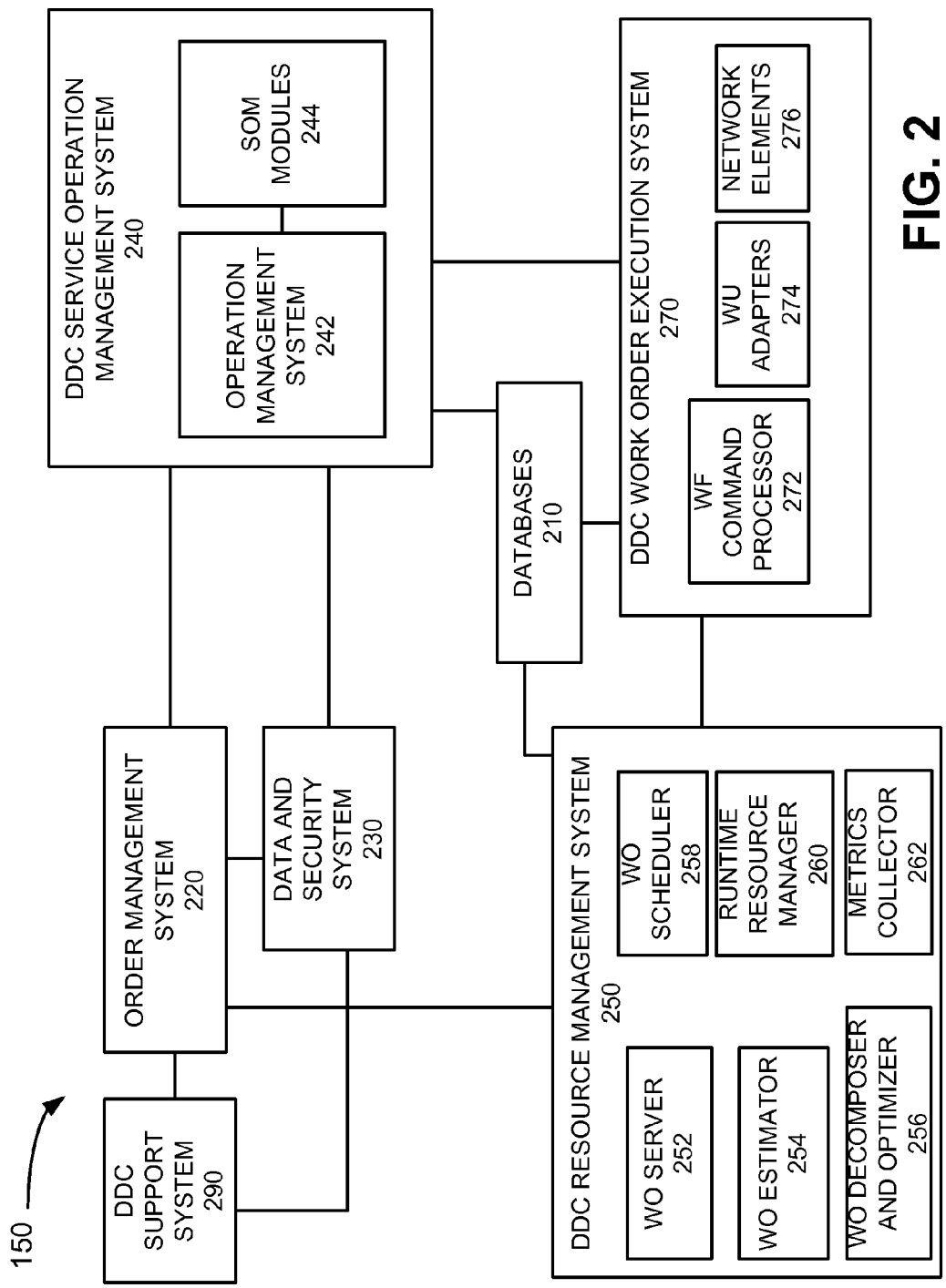
FIG. 2 is a diagram illustrating an exemplary embodiment of the DDC illustrated in FIG. 1.

FIG. 2 illustrates an exemplary embodiment of DDC 150. Referring to FIG. 2, DDC 150 may include databases 210, order management system 220, data and security system 230, DDC service operation management system 240, DDC resource management system 250, DDC work order execution system 270, and DDC support system 290.

Databases 210 may store work unit definitions, work flows, parameters, tables, etc., that are associated with various devices, components, etc., in DDC 150, intermediate or end results of processing performed by different processes in DDC 150, etc.

Order management system 220 may include one or more devices (e.g., a server device, a computing device, etc.) for managing customer orders, generating reports, etc. According to an exemplary embodiment, order management system 220 may include client components that interface with components of DDC service operation management system 240. The client components (e.g., web browser) may receive customer orders, requests for reports, etc., and relay the received information to the components of DDC service operation management system 240 for the creation, validation, estimation, submission, approval, execution and reporting of activities associated with the customer orders, request for reports, etc. For example, a customer order may be completed by sending, to a component of DDC service operation management system 240, a selection of a particular work flow that will drive the processing of content associated with the order.

Data and security system 230 may include one or more devices (e.g., a server device, a computing device, etc.) to provide for authentication and authorization of users having roles in DDC 150 and/or for taking actions that are associated with the authorized roles (e.g., create user accounts, remove user accounts, generate an initial password, etc.). For example, when a user logs in as a DDC operator, the user may be authorized to design work units and/or compose work flows. According to an exemplary embodiment, data and security system 230 may interface with order management system 220, DDC service operation management system 240, and DDC support system 290.

DDC service operation management system 240 may include one or more devices (e.g., a server device, a computing device, etc.) to control an overall operation, configuration, and management of DDC 150. For example, DDC service operation management system 240 may include operation management system 242 and service operation management modules 244. Via a client component that communicates with operation management system 242, a user may control the configuration, administration and operation of DDC 150. For example, in one implementation, via a web browser or another client application, a user may control security, compose a work flow, administer accounts that are associated with content creator 110 or DMR 130, submit a work order, add data to storage of DDC 150, manage resources, manage DDC configuration (e.g., create a work unit), manage catalogs of content, run reports, monitor DDC work orders (e.g., information associated with a work order), etc.

In providing each of such services to a client, operation management system 242 may employ service operation management (SOM) modules 244. SOM modules 244 may include components that correspond to the above-listed services. For example, SOM modules 244 may include a security manager, a work flow manager, an account manager, a work order manager, a data and storage manager, a resource management module, a configuration manager, an asset management module, a catalog management module, a monitoring and reporting module, etc. DDC service operation management system 240 may further include a graphical user interface (GUI) for interfacing with SOM modules 244.

DDC resource management system 250 may include one or more devices (e.g., a server device, a computing device, etc.) that support the capacity management of resources associated with network elements (NEs) of DDC 150. As illustrated in FIG. 2, DDC resource management system 250 may include a work order server 252, a work order estimator 254, a work order decomposer and optimizer 256, a work order scheduler 258, a runtime resource manager 260, and a metrics collector 262.

Work order server 252 may provide work order-related interfaces to operation management system 242 and/or SOM modules 244, and may communicate with work order estimator 254, work order decomposer and optimizer 256, and work order scheduler 258 to submit, decompose, validate, and save work orders, and to estimate, schedule, and reserve resources during an order submission.

Work order estimator 254 may estimate the cost of completing a decomposed work order across work units of a work flow, based on resources that are associated with the work units for each resource type. Work order estimator 254 may store the cost in one of databases 210 in terms of resource capacity units (RCUs) and duration of time required to complete work unit tasks, sub-work unit tasks, processes, etc., which may pertain to the execution of the work order. The term "RCU", as used herein, may include a unit of measure for a resource type. For example, an RCU may correspond to bits per second, tasks per hour, CPU processing time, etc., or some other type of quantity of unit (e.g., capacity unit) by time (e.g., a time unit, such as, hour, minute, second, millisecond, etc.), quantity of unit (e.g., gigabyte (GB) for storage, megabits for bandwidth, etc), etc.

Work order decomposer and optimizer 256 may break down an order into work units based on the work flow associated with the order. Furthermore, based on the decomposition, work order decomposer and optimizer 256 may generate work unit tasks, or simply "tasks," assign work unit task parameters, create work unit task connectors, etc., which are described further below.

Work order scheduler 258 may match cost estimates for different resource types for a work order to available time slots in an allocation schedule across different network elements (e.g., hardware/software components that perform underlying operations for a work unit). As a result of the scheduling, work order scheduler 258 may output start and end times for each of the work unit tasks and for resource reservations.

Runtime resource manager 260 may allocate network elements/user groups to a process at the time of execution on behalf of a work unit. Runtime resource manager 260 may attempt to honor scheduled reservations of resources. However, if the resources are unavailable, runtime resource manager 260 may attempt to obtain replacement resources.

Metrics collector 262 may determine, for each work unit, actual time of completion and used/consumed resources associated with the execution of the work unit. Based on previous actual execution measurements of a work unit, metrics collector 262 may modify factors that are used to estimate the resource and time necessary to complete a task associated with a work unit for a particular content.

DDC work order execution system 270 may include one or more devices (e.g., a server device, a computing device, etc.) to manage the flow and execution of work units of a defined work flow associated with a work order. DDC work order execution system 270 may include a work flow command processor 272, work unit adapters 274, and network elements 276. For simplicity, FIG. 2 does not illustrate other components of DDC work order execution system 270. For example, DDC work order execution system 270 may include a work unit processor (not illustrated). Depending on the implementation, DDC work order execution system 270 may include additional, fewer, or different components than those illustrated in FIG. 2.

Work flow command processor 272 may drive work order execution. According to an exemplary embodiment, work flow command processor 272 may include a work order manager, a work order processor, and a work unit processor (not illustrated). The work order manager may provide interfaces to resource management system 250 for initiating an execution of a work order, retrieving the status of the work order, suspending/resuming the work order execution, canceling the work order, etc. The work order processor may coordinate work unit tasks for completion of a work order. In coordinating different work unit tasks, the work order processor may sequence the tasks for optimum execution time and resource utilization. The work order processor may communicate with runtime resource manager 260 for allocation and de-allocation of resources. The work unit processor may dispatch processes/threads to perform a work unit task. A further description of work flow command processor 272 is provided below.

Work unit adapter 274 may include interfaces for adapting network elements to perform media content processing corresponding to a work unit. In one implementation, each work unit adapter 274 may be versioned and may include Java code. Each work unit adapter 274 may monitor the corresponding network element to prevent over-allocation of the network element, maintain normal execution of logic associated with the network element, and provide real-time information to metrics collector 262.

Network elements 276 may include physical or logical network devices/components for ingesting, transforming, and distributing content.

DDC support system 290 may include one or more devices (e.g., a server device, a computing device, etc.) and/or personnel to provide support services, such as creation of work units, composition of work flows, etc., billing support, contracting management, pricing, etc.

According to other exemplary embodiments, DDC 150 may include additional, fewer, different, and/or a different arrangement of devices than those illustrated in FIG. 2. The configuration shown in FIG. 2 is for illustrative purposes. In other configurations and/or implementations, functions that are associated with one component illustrated in FIG. 2 may be performed by one or more other components in FIG. 2; any of the components may be connected to any other of the components; and functions of one component may be included in another component. Accordingly, in the other configurations or implementations, DDC 150 may include additional, fewer, different, or a different arrangement of components than those illustrated in FIG. 2. For example, according to an exemplary embodiment, DDC resource management system 250 may include a component for providing reports on resources, schedules, metrics, etc.

Figure 3:
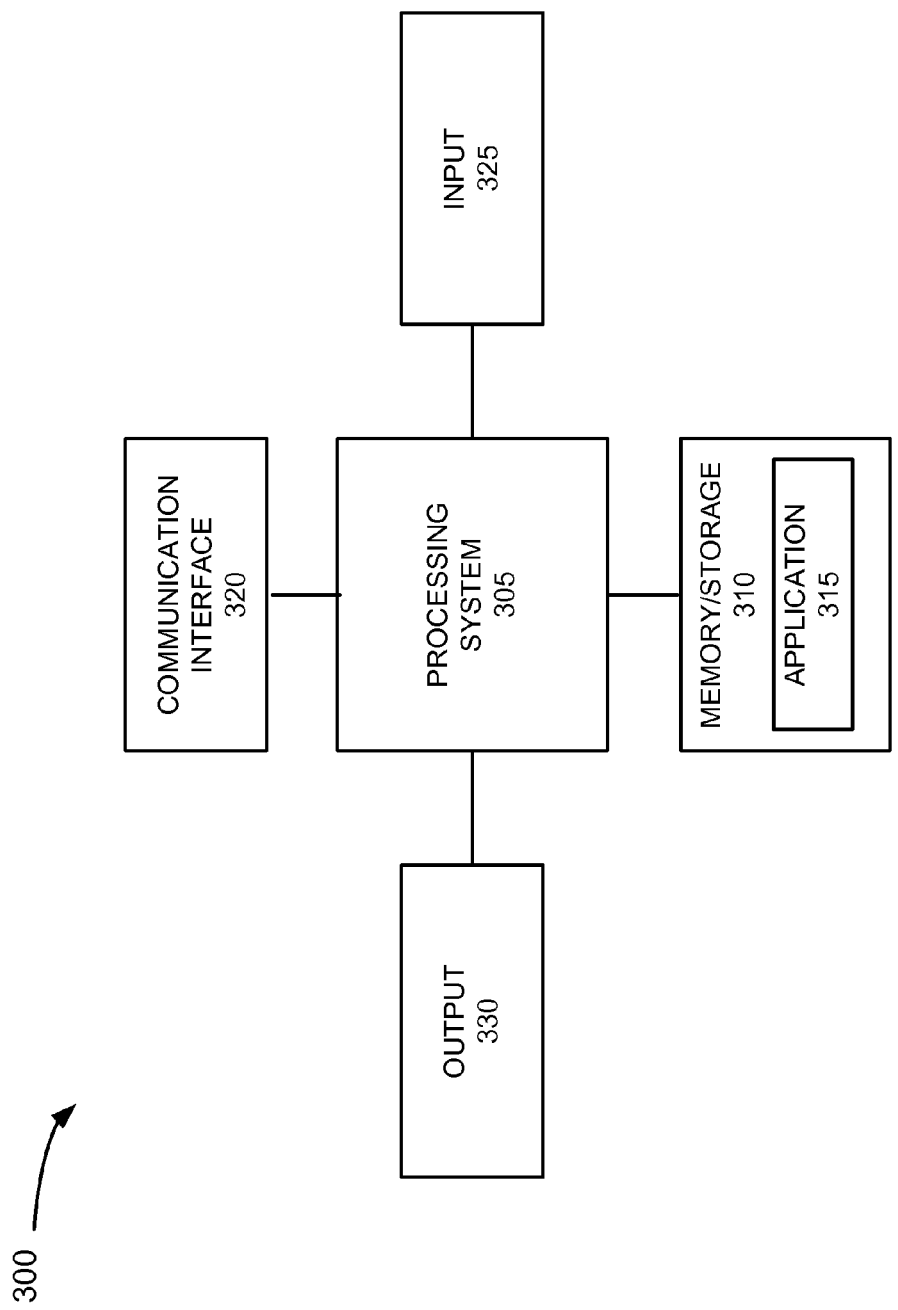
FIG. 3 is a diagram illustrating exemplary components of an exemplary embodiment of one or more devices illustrated in FIG. 2.

FIG. 3 is a diagram illustrating exemplary components of a device 300 that may correspond to one or more of the devices in network 100. For example, device 300 may correspond to one or more devices pertaining to DDC 150, such as, databases 210, order management system 220, data and security system 230, DDC service operation management system 240, DDC resource management system 250, DDC work order execution system 270, and DDC support system 290, as well as correspond to one or more devices pertaining to content creator 110, advertiser 120, digital media retailer 130, and/or consumer 140.

As illustrated, according to an exemplary embodiment, device 300 may include a processing system 305, memory/storage 310 including an application 315, a communication interface 320, an input 325, and an output 330. According to other embodiments, device 300 may include fewer components, additional components, different components, and/or a different arrangement of components than those illustrated in FIG. 3 and described herein.

Processing system 305 may include one or multiple processors, microprocessors, data processors, co-processors, application specific integrated circuits (ASICs), controllers, programmable logic devices, chipsets, field programmable gate arrays (FPGAs), application specific instruction-set processors (ASIPs), system-on-chips (SOCs), and/or some other component or logic that may interpret and/or execute instructions and/or data. Processing system 305 may control the overall operation or a portion of operation(s) performed by device 300. Processing system 305 may perform one or multiple operations based on an operating system and/or various applications (e.g., application 315). Processing system 305 may access instructions from memory/storage 310, from other components of device 300, and/or from a source external to device 300 (e.g., a network, another device, etc.).

Memory/storage 310 may include one or multiple memories and/or one or multiple other types of storage devices. For example, memory/storage 310 may include a random access memory (RAM), a dynamic random access memory (DRAM), a read only memory (ROM), a programmable read only memory (PROM), a flash memory, a phase-change memory (PCM), and/or some other type of storing medium (a computer-readable medium, a compact disk (CD), a digital versatile disk (DVD), etc.). Memory/storage 310 may include a hard disk (e.g., a magnetic disk, an optical disk, a magneto-optic disk, a solid state disk, etc.) or some other type of storing medium, along with a corresponding drive. Memory/storage 310 may be external to and/or removable from device 300, such as, for example, a Universal Serial Bus (USB) memory, a dongle, a hard disk, mass storage, off-line storage, etc.

The term "computer-readable medium," as used herein, is intended to be broadly interpreted to include, for example, a memory, a storage medium, a CD, a DVD, a Blu-ray disc, or another type of tangible storing medium. Memory/storage 310 may store data, application(s), and/or instructions related to the operation of device 300.

Application 315 may include software that provides various services and/or functions. For example, with reference to work flow command processor 272 and according to an exemplary embodiment, application 315 may include one or multiple applications for executing work flows, work units, etc., as described herein. Additionally, or alternatively, for example, with reference to other devices, components, etc., of DDC 150, applications 315 may include one or multiple applications for performing processes, functions, operations, etc., that are described herein.

Communication interface 320 may permit device 300 to communicate with other devices, networks, systems, etc., illustrated in network 100. Communication interface 320 may include one or multiple wireless interfaces and/or wired interfaces. Communication interface 320 may include one or multiple transmitters, receivers, and/or transceivers. Communication interface 320 may operate according to one or multiple protocols, standards, and/or the like.

Input 325 may permit an input into device 300. For example, input 325 may include a keyboard, a mouse, a camera, a scanner, a microphone, a display, a touchpad, a button, a switch, an input port, voice recognition logic, fingerprint recognition logic, a web cam, and/or some other type of visual, auditory, tactile, etc., input component. Output 330 may permit an output from device 300. For example, output 330 may include a speaker, a display, a light, an output port, and/or some other type of visual, auditory, tactile, etc., output component.

As described herein, device 300 may perform processes in response to processing system 305 executing software instructions (e.g., application 315) stored by memory/storage 310. By way of example, the software instructions may be read into memory/storage 310 from another memory/storage 310 or from another device via communication interface 320. The software instructions stored by memory/storage 310 may cause processing system 305 to perform one or more processes described herein. Alternatively, for example, according to other implementations, device 300 may perform one or more processes described herein based on the execution of hardware (processing system 305, etc.), the execution of hardware and firmware, or the execution of hardware, software, and firmware.

Referring to FIG. 2, as previous described, DDC 150 may include, among other devices, DDC work order execution system 270. Further, as previously described, according to an exemplary embodiment, DDC work order execution system 270 may include work flow command processor 272. A further description of work flow command processor 272 is provided below.

Work flow command processor 272 may execute work orders. For example, work flow command processor 272 may execute a work order based on resource allocations and work unit and work flow controls. Work flow command processor 272 may execute the work order as soon as the work order is received or based on a schedule. The execution of the work order may include content ingestion, content transformation, and/or content distribution.

Figure 4:
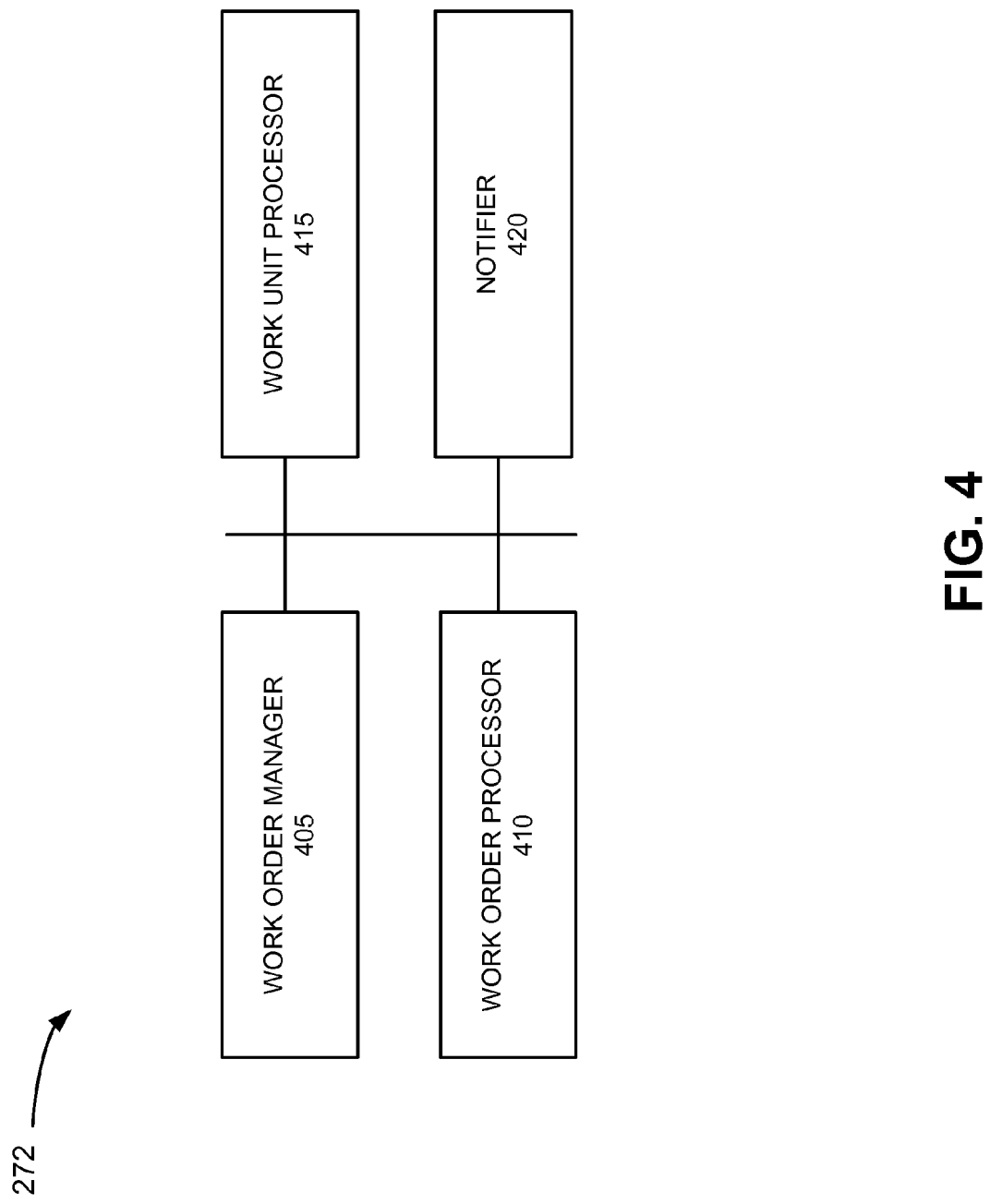
FIG. 4 is a diagram illustrating an exemplary embodiment of a DDC work order execution system illustrated in FIG. 2.

According to an exemplary embodiment, work flow command processor 272 may include the following components: a work order manager 405, a work order processor 410, a work unit processor 415, and a notifier 420, as illustrated in FIG. 4.

Work order manager 405 may include various work order management functions, which pertain to the execution and/or management of a work order, work flow, work unit, etc., such as, for example, an initiating function, a status retrieving function, a suspending function, a resuming function, and a canceling function. Work order manager 405 may include interfaces to communicate with DDC resource management system 250 via (e.g., application programming interfaces (APIs), etc.), as well as other components of DDC 150.

Work order processor 410 may control a flow between work unit processes to fulfill the requirements associated with a work order. For example, the work order may include requirements that pertain to content ingestion, content transformation, and distribution of the content. Work order processor 410 may include interfaces to communicate with DDC resource management system 250 via (e.g., APIs, etc.), as well as other components of DDC 150. According to an exemplary embodiment, work order processor 410 may communicate with DDC resource management system 250, in real-time, for the allocation and de-allocation of resources that may be needed to successfully complete the work order based on the requirements of the work order.

Work order processor 410 may review and update states associated with a work unit task and work unit task connector parameters for each time unit of execution pertaining to the work unit. For example, a work unit task connector parameter state model may include a new state, an active state, a cancelled state, an in-process state, a complete state, and an error state. According to an exemplary embodiment, work order processor 410 may manage a state associated with work unit task connector parameters for each current time unit cycle of execution. For example, when a work order is received, work unit task connector parameters may be in a new state or a pending state. When a scheduled date and time for processing a work order occurs and resource allocations for the work order are verified (e.g., by work order scheduler 258 of DDC resource management system 250, etc.), work order processor 410 may update a state of the work unit task connector parameters to an active state. When a work unit starts, work order processor 410 may update the work unit task connector parameters that are in the active state to an in-process state. Once the work unit is completed, work order processor 410 may update the work unit task connector parameters that were in the in-process state to an end-status, such as, a complete state or an error state. As described further below, work unit task connector parameters may also include other parameters pertaining to a work unit. For example, according to an exemplary embodiment, the work unit task connector parameters may include parameters pertaining to input connector points, output connector points, and connectors.

As previously described, work order processor 410 may control the flow between work unit processes to fulfill the requirements associated with a work order. For example, work order processor 410 may sequence work unit tasks in a manner that optimizes execution time and resource utilization. Work order processor 410 may communicate with DDC resource management system 250 (e.g., runtime resource manager 260) to allocate and de-allocate resources for processing the work order.

Work unit processor 415 may manage the execution of work unit tasks, for example, in terms of concurrency, priority, etc., in order to ingest, process, and/or distribute content. For example, work unit processor 415 may include the execution dispatch logic of each work unit that was previously developed (e.g., via a Websphere Process Server (WPS) or other type of device). Work unit processor 415 may manage the execution of work unit tasks using work unit adapters 274 and network elements 276.

Work unit processor 415 may use various techniques to optimize the processing of content. By way of example, work unit processor 415 may re-use previously processed content within a work order. For example, previously processed content may be available in a working storage area or in an archived storage area. In this way, work unit processor 415 may avoid unnecessary re-processing of content.

Additionally, work unit processor 415 may optimize the processing of work units that include repetitive operations. By way of example, work unit processor 415 may optimize encryption of content for more than one DMR 130 or may optimize pipelining and/or overlapping processing of content as much as possible per work flow definitions. Additionally, a work unit may self-evaluate its input and output requirements, and if the content has already been completed and is available, then the work unit may re-use the available content to satisfy its input and/or output requirements. Work unit processor 415 may also take into account work unit parallelism and work unit pipelining of content to compress the overall work flow execution time.

Work unit processor 415 may process work units based on various work flow types, such as, for example, an overlapped pipeline work flow, a locked sequence work flow, and a staggered (e.g., based on dates of quantity, type, time, etc.) work flow. In the event of work flow fall-out (e.g., error, overload, etc.), work unit processor 415 may route the work flow to the appropriate user group (e.g., by account).

According to an exemplary embodiment, the execution of a work unit may include a human task. According to such an embodiment, work unit processor 415 may dispatch the process to the appropriate functional user group that may perform a function (e.g., review, approve, respond to an error (e.g., resolve, retry, abort, etc.), or some other type of manual intervention, etc.) required by the work unit. A user may use any available resources that are functionally capable of completing the human task. According to an exemplary embodiment, a user group may be mapped to a resource type that provides for completion of a human task associated with a work unit.

Notifier 420 may receive and manage notification events from all processes within DDC 150. A notification event may be informational or require a response (e.g., a resolution action, etc.). According to an exemplary embodiment, notifier 420 may route a notification event to the appropriate user group or component of DDC 150.

Figure 5A:
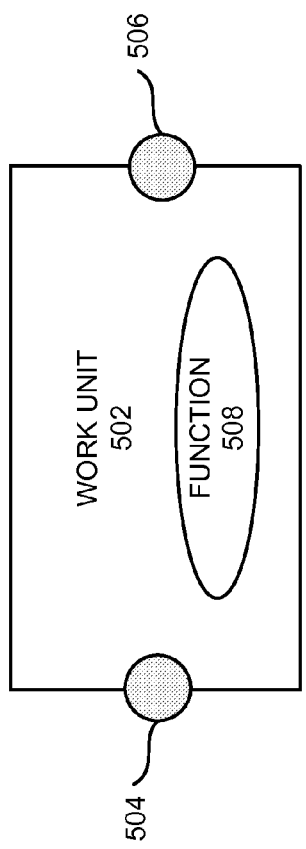
FIG. 5A is a diagram illustrating an exemplary embodiment of a work unit.

FIG. 5A is a diagram illustrating an exemplary embodiment of a work unit 502. As illustrated, work unit 502 may include an input connector point 504 (or an input 504), an output connector point 506 (or an output port 506), and a function 508. According to other exemplary embodiments, work unit 502 may include additional elements, fewer, and/or different elements than those illustrated and described with respect to FIG. 5A.

Input connector point 504 may allow an input (e.g., content) to be received by work unit 502. Input connector point 504 may include a connector type. For example, a connector type may correspond to a type of content (e.g., metadata, image, video, etc.). The connector type and/or the number of input connector points 504 may depend on function 508.

Output connector point 506 may allow an output (e.g., content) to be output by work unit 502. Output connector point 506 may include a connector type. For example, a connector type may correspond to a type of content (e.g., metadata, image, video, etc.). The connector type and/or the number of input connector points 506 may depend on function 508.

Function 508 may correspond to one or more work unit tasks that may be performed by work unit 502 based on the input received via input connector point 504, various parameters that function 508 may use to carry-out the one or more work unit tasks, and the expected output via output connector point 506. A further description of work unit 502 is provided below.

Figure 5B:
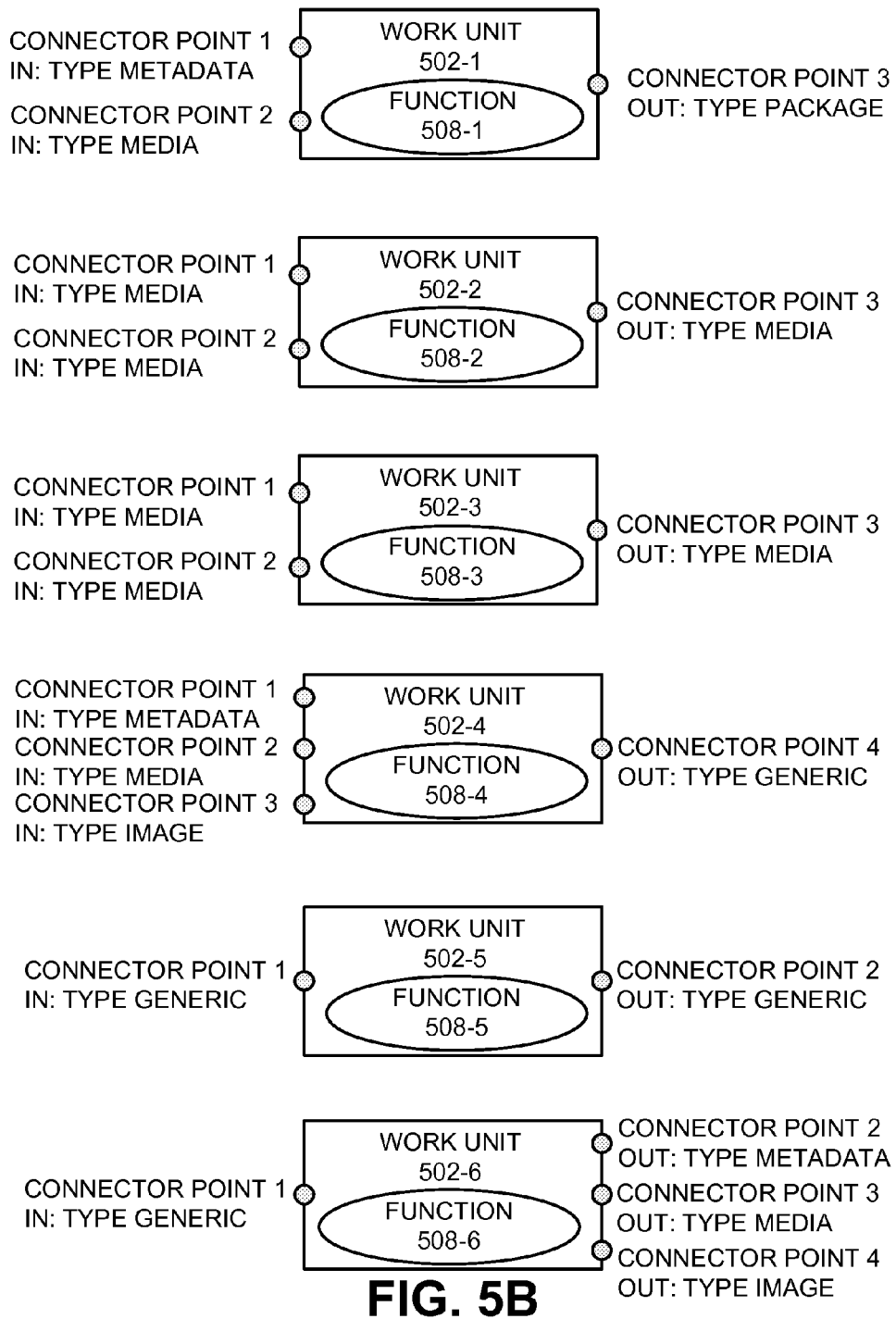
FIG. 5B is a diagram illustrating exemplary embodiments of different types of work units.

FIG. 5B is a diagram illustrating exemplary embodiments of different types of work units. As illustrated, work units 502-1 through 502-6 may include, among other things, a different number of input connector points 504, a different number of output connector points 506, different types of input connector points 504, different types of output connector points 506, and different functions 508. In this regard, work units 502 may differ in function and connection point requirements.

Referring to work unit 502-1, input connector point 1 may be configured to receive metadata, input connector point 2 may be configured to receive media, and function 508-1 may be configured to structurally change inbound types (e.g., metadata and media) to a new outbound type (e.g., a package). For example, a package may refer to media content (e.g., video, audio, multimedia, etc.) and additional data (e.g., metadata). Work unit 502-1 may receive the metadata and the media content as input and may output a package by combining the metadata and the media content.

Referring to work unit 502-2, input connector point 1 may be configured to receive media, input connector point 2 may be configured to receive media, and function 508-2 may be configured to merge the media. For example, the media received via input connector points 1 and 2 may be of the same type (e.g., media streams) and used to generate a new media (e.g., a new media stream). According to an exemplary implementation, work unit 502-2 may merge the media based on a round-robin approach or some other type of input connector point sequence.

Referring to work unit 502-3, input connector point 1 may be configured to receive media, input connector point 2 may be configured to receive media, and function 508-3 may be configured to combine the media. For example, the media received via input connector points 1 and 2 may be of a different type and used to generate a new media.

Referring to work unit 502-4, input connector point 1 may be configured to receive metadata, input connector point 2 may be configured to receive media, input connector point 3 may be configured to receive an image, and function 508-4 may be configured to merge the inputs received. Since the output of work unit 502-4 can vary depending on its inputs, output connector point 506 is of a generic type (e.g., the output may be of any type).

Referring to work unit 502-5, input connector point 1 may be of the generic type and may be configured to receive any type of content, function 508-5 may perform one or more work unit tasks, and output connector point 2 may be of a generic type that outputs content. By way of example, function 502-5 may duplicate the content and concatenate the duplicate content with the original content.

Referring to work unit 502-6, input connector point 1 may be of the generic type and may be configured to receive any type of content, function 508-5 may perform a sort, output connector point 2 may be configured to output metadata, output connector point 3 may be configured to output media, and output connector point 4 may be configured to output an image. For example, function 502-6 may sort any type of content as metadata, media, and image.

According to other exemplary embodiments, work unit 502 may correspond to other types of work units. By way of example, work unit 502 may include other types of input connection points or other types of output connection points. Additionally, as previously described, the work unit task connector parameters may include parameters to indicate the type of content (e.g., media, metadata, generic, image, etc.) pertaining to a connection point of a work unit. In turn, connector points may be matched (e.g., type of content, etc.) with connectors. Connectors are described further below in FIG. 5C and elsewhere in this description.

Additionally, or alternatively, work unit 502 may include other types of functions. For example, work unit 502 may include an error connection point that may communicate with an error handling work unit. According to such an embodiment, error handling work unit parameters may be used to define criteria for handling an error. For example, the parameters may include error logging parameters, notification to user parameters, human intervention parameters, work flow parameters (e.g., stopping work flow, suspending work flow, etc.), labeling error (e.g., severe, etc.). Additionally, or alternatively, work unit 502 may include other types of content-specific connection points (e.g., video, audio, etc.), processed content connection points (e.g., compressed video connection point, etc.), format-specific content (e.g., high-definition video, etc.), etc. Additionally, or alternatively, work unit 502 may include only an input connection point or only an output connection point. According to such embodiment(s), work unit task connector parameters may include parameters corresponding to specific types of errors, other types of content, etc.

Additionally, or alternatively, functions 508 may correspond to other types of processes. By way of example, work unit 502 may include functions, such as, for example, create metadata, transform metadata (e.g., converting metadata format, etc.), pull metadata (e.g., obtain, retrieve, receive, etc., metadata from a source (e.g., a content provider, such as content creator 110, advertiser 120, etc.), pull content (e.g., obtain, retrieve, receive, etc., content from a source), confirm delivery (e.g., with respect to content), split content, distribute (e.g., distribute content to a DMR, etc.), encrypt, decrypt, encode, decode, close captioning (e.g., overlay a transcript of audio, etc.), branch (e.g., send copies of metadata to multiple work units, etc.), ad marker (e.g., insert advertisements in content, etc.), archive, save, retrieve, quality assurance (e.g., check a quality of the processed content, etc.), manual intervention (e.g., assign work to human workers, etc.), report (e.g., send different types of reports to users, etc.), transcode (e.g., content), assemble (e.g., assemble data for generating a work order), inserting logos or black space into the content, etc.

Figure 5C:
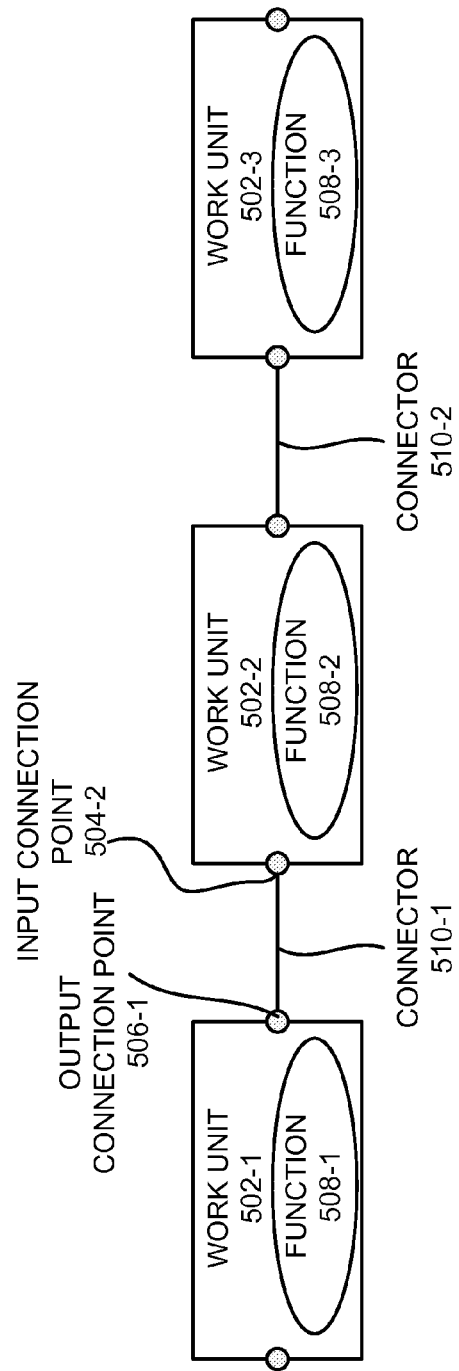
FIG. 5C is a diagram illustrating a series of work units.

FIG. 5C is a diagram illustrating a series of work units 502. According to an exemplary embodiment, work units 502 may be connected to each other based on connectors 510. For example, as illustrated in FIG. 5C, connector 510-1 may connect work units 502-1 and 502-2, and connector 510-2 may connect work units 502-2 and 502-3. According to an exemplary embodiment, connector 510 may correspond to particular type (e.g., similar to input connection point 504, output connection point 506). For example, connector 510-1 may be of the same type as output connection point 506-1 and input connection point 504-2. Additionally, according to an exemplary embodiment, connector 510 may also include connector criteria that controls whether or not connector 510 is active. The connector criteria may permit or prevent data to flow from one work unit 502 to another work unit 502, to flow from one connection point to another connection point, etc.

Connector 510 may facilitate the transfer of data (e.g., content, parameters, etc.) between work units 502. Connector 510 may also communicate with databases 210 to obtain data. According to an exemplary embodiment, a sending work unit (e.g., work unit 502-1) may provide connector 510-1 with data, and a receiving work unit (e.g., work unit 502-2) may receive the data. For example, the receiving work unit may receive the data based on processes associated with DDC work order execution system 270 (e.g., work unit processor 415).

According to an exemplary embodiment, databases 210 may include storing work unit definitions. For example, DDC service operation management system 240 may permit a user to create a work unit, create work unit parameters as well as other data that may define the work unit. As previously described, DDC work order execution system 270 may receive work unit tasks from databases 210. A further description of a work unit definition is provided below.

Figure 5D:
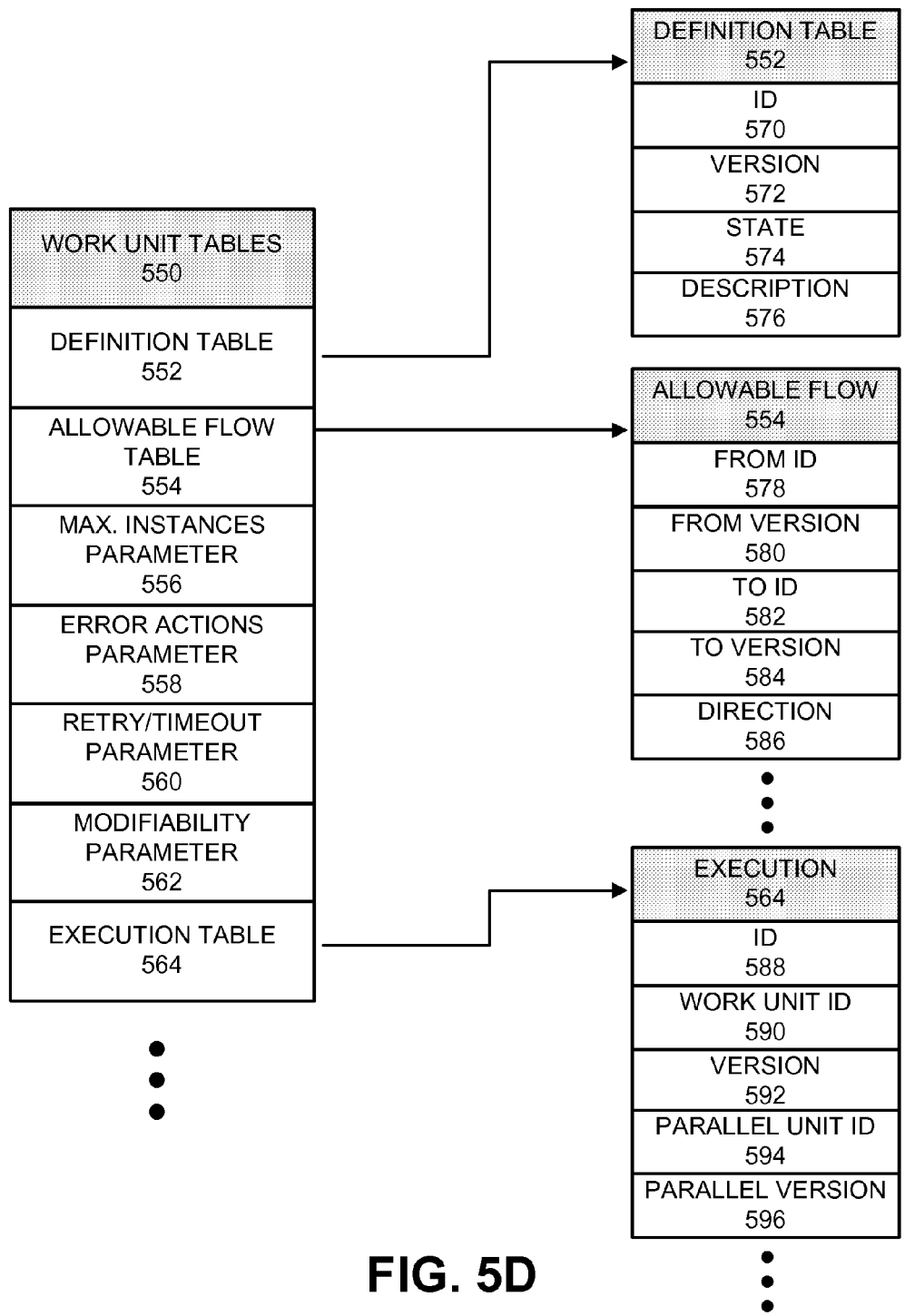
FIG. 5D is a diagram illustrating exemplary tables and parameters that may be related to a work unit.

FIG. 5D is a diagram illustrating exemplary tables and parameters that may be related to a work unit. When a work unit or other related components (e.g., a work flow, a connector, a work order, etc.) are created, DDC service operation management system 240 may update or generate such tables and parameters, in databases 210 or in memory/storage 310, that characterize and track the work unit and the other components. The diagram in FIG. 5D illustrates the relationship between the tables, as well as parameters that pertain to the work unit.

As illustrated, work unit tables 550 may include a work unit definition table 552, an allowable flow table 554, maximum instances parameter 556, error actions parameter 558, retry/timeout parameter 560, modifiability parameter 562, and execution table 564. Although DDC 150 may include other work unit-related tables or parameters, for simplicity, they are not illustrated in FIG. 5D. Additionally, according to other embodiments, DDC 150 may include additional, fewer, different, or differently arranged tables than those illustrated in FIG. 5D. For example, according to an exemplary embodiment, work unit definition table 552 may include information included in allowable flow table 554.

Definition table 552 may include a work unit ID 570, a work unit version number 572, a work unit state 574, and a description 576. Work unit ID 570 may identify a work unit. Work unit version number 572 may identify a version of the work unit. For example, work unit ID 570 and version number 572 may be generated and/or assigned to a work unit when the work unit is created. A work unit may be assigned a new work unit version number 572 when, for example, the work unit is updated. In such instances, work unit ID 570 may remain the same. Work unit state 574 may indicate a current state of the work unit (e.g., "new," "active," "inactive," "testing," "tested," etc.).

According to an exemplary embodiment, work unit ID 570 and version number 572 may be used to associate a work unit with a work flow. In this way, when a work unit is updated and ready to be used (e.g., passed testing, etc.), work unit state 574 may be updated to "active," which may automatically cause work unit state 574 of the older version work unit to become "inactive." In this way, the updated work unit may be automatically used in work flows (e.g., future work flow executions) in which the older version work unit was included. Description 576 may include a description (e.g., in text) pertaining to the functionality of the work unit.

Allowable flow table 554 may indicate whether work units may be interconnected, and may include a From ID 578, a From version 580, a To ID 582, a To version 584, and a direction 586. From ID 578 and From version 580 may indicate a work unit ID and a version of one of the work units. To ID 582 and To version 584 may indicate a work unit ID and a version of another one of the work units. Direction 586 may indicate a direction in which data is to flow between the work units (e.g., forward, reverse, etc.). Allowable flow table 554 may also specify a work unit's allowed relationships with other work units. By way of example, allowable flow table 554 may specify which work units may be allowed before it and which work units may be allowed after it.

Execution table 564 may include runtime information used for execution of a work unit. During an execution of logic (e.g., program, scripts, etc.) associated with a work unit, DDC 150 may create an instance of execution table 564 corresponding to the work unit, to control and/or track the progress of the execution. Accordingly, execution table 564 may include a work unit execution ID 588, work unit ID 590, work unit version 592, parallel unit ID 594, and parallel version 596. For simplicity, other entries in work execution table 564 are not illustrated (e.g., additional parallel IDs and parallel versions).

Work execution ID 588 may identify a process (e.g., a runtime instance of a program or a script) or thread associated with the work unit. Work unit ID 590 and work unit version 592 may identify the work unit and the work unit version associated with the process, script, thread, etc. Parallel unit ID 594 and parallel version 596 may identify a version of the work unit that may be executed in parallel with the work unit identified by fields 590 and 592. In other words, it may be specified which work unit(s) may be executed in parallel with another work unit.

Figure 5E:
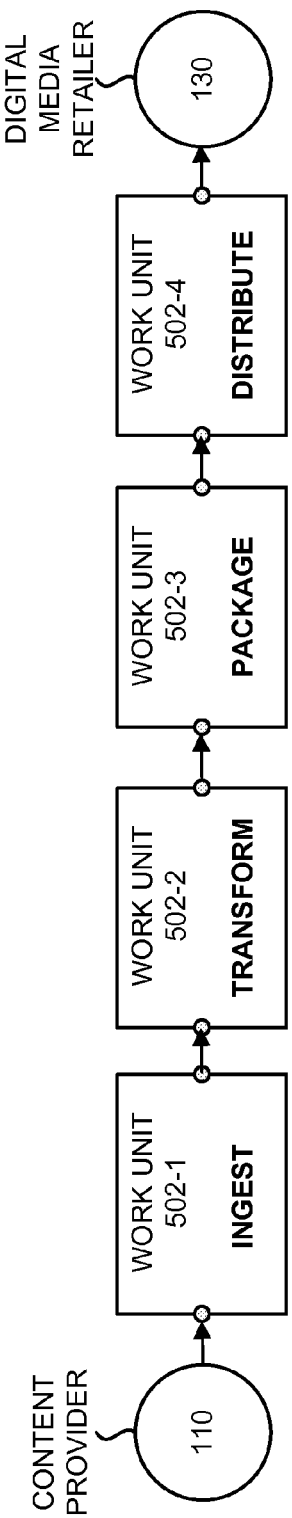
FIG. 5E is a diagram illustrating an exemplary embodiment of a work flow diagram.

FIG. 5E is a diagram illustrates an exemplary embodiment of a work flow diagram. According to an exemplary embodiment, DDC 150 may display work flow diagrams at a GUI client via DDC service operation management system 240. For example, a DDC operator may edit and/or save such work flow diagrams. As illustrated in FIG. 5E, the work flow diagram may include a content creator/provider 110, work units 502-1 through 502-4, and a DMR 130. In this example, work unit 502-1 may include an ingest function, work unit 502-2 may include a transform function, work unit 502-3 may include a package function, and work unit 502-4 may include a distribute function. Other work flow diagrams may include the same, additional, and/or different work units than those illustrated in FIG. 5E.

During execution of a work unit, a work flow, etc., DDC work order execution system 270 may use resources allocated by DDC resource management system 250. For example, when a work order is processed by DDC resource management system 250, work order estimator 254 may estimate the number of RCUs needed to execute the work order within a work flow. Work order estimator 254 may consider, among other things, content type, functions (e.g., work units) needed to process the content, number of copies requested, cost factors, time factors, etc. As an example, a content type may correspond to a movie, which is CableLabs compliant, approximately 2 hours in length, 4 gigabytes in size, and of an MPEG-2 format. According to other examples, the content type may include additional or fewer parameters. For example, a content type may correspond to one or more of the following parameters, such as, content (e.g., audio, video, image, metadata, etc.), file type (e.g., a windows media video (WMV) file, audio video interleave (AVI) file, Joint Photograph Experts Group (JPEG) file, etc.), compliance (e.g., CableLabs, etc.), other characteristics associated with the content (e.g., length, size, etc.), etc.

Work order scheduler 258 may schedule the execution of a work order. After a work order is scheduled, runtime resource manager 260 may communicate with DDC work order execution system 270 to facilitate execution of the work order. For example, runtime resource manager 260 may allocate network elements 276 and user groups at the time of execution. According to an exemplary embodiment, runtime resource manager 260 may determine if the resources that were calculated (e.g., by work order estimator 254) and planned to be used (e.g., by work order scheduler 258) are currently available. In the event that the resources are not available, runtime resource manager 260 may check the current capacity associated with network elements 276 and user groups. Runtime resource manager 260 may allocate alternate resources when the originally scheduled resources are not available.

Figure 6:
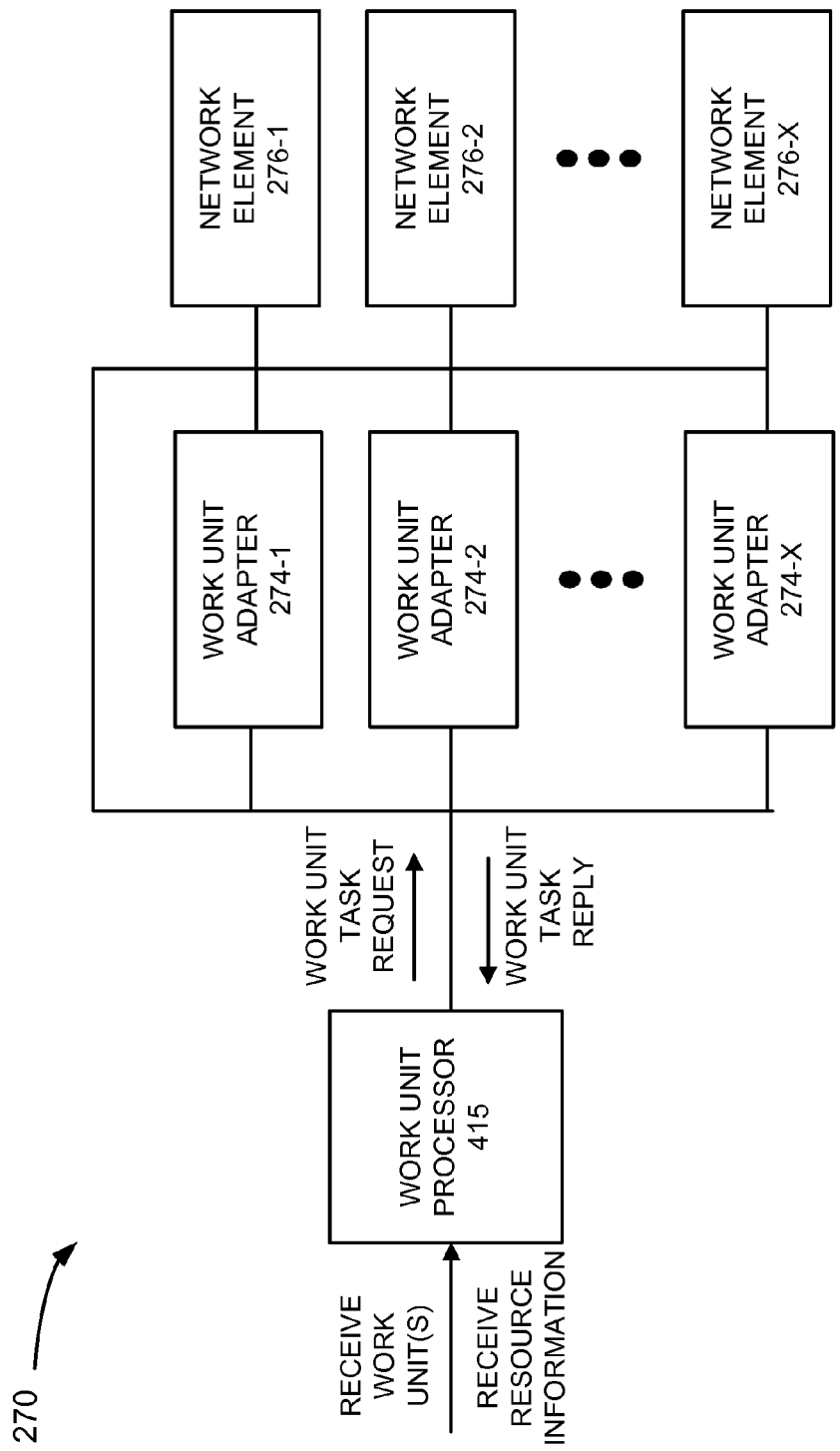
FIG. 6 is a diagram illustrating an exemplary process for executing a work unit task associated with a work order.

FIG. 6 is a diagram illustrating an exemplary process for executing a work unit task associated with a work order by DDC work order execution system 270. The process is described with reference to various messages, interaction between devices, components, etc., of DDC 150, in particular DDC work order execution system 270, and with reference to operations performed by the devices, components, etc., illustrated. These messages, interactions, and operations are exemplary. According to other embodiments, the process may include additional messaging, different messaging, etc., additional interaction, different interaction, etc., and/or additional operations, different operations, etc., than those illustrated and described.

According to an exemplary embodiment, based on the work unit task information and/or resource information, work unit processor 415 may select a work unit adapter 274 to assist in executing the work unit task. For example, DDC resource management system 250 may provide work flow command processor 272 with resource information that includes, among other things, the appropriate work unit adapter(s) 274 and network element(s) 276 to execute the work unit task. For example, the resource information may include network address(es), work unit adapter identifier(s), network element identifier(s) to allow work unit processor 415 to select the appropriate work unit adapter 274 and network element 276. Based on the resource information, work unit processor 415 may send a work unit task request to work unit adapter 274. The work unit task request may include, for example, work unit definitions and other parameters necessary to execute the work unit task. According to an exemplary embodiment, work unit adapter 274 may translate the work unit definitions and other parameters to a format which network element 276 understands and is able to use. For example, network element 276 may correspond to a third party application that may run on a platform (e.g., operating system, etc.) different from DDC 150. Upon translation, work unit adapter 274 may select the appropriate network element(s) 276 to carry out the execution of the work unit task. In some cases, work unit adapter 274 may communicate with multiple network elements 276, but the details may be abstracted from the work unit. For example, work unit adapter 274 may provide encapsulation, via a common application programming interface (API), in which a request to a network element 276 may include a network element identifier. When network element 276 receives the translated work unit definitions and other parameters, network element 276 may execute the work unit task.

According to an exemplary embodiment, upon completion of the execution of the work unit task, network element 276 may send a work unit task reply to work unit processor 415 (e.g., via work unit adapter 274) that indicates the work unit task is complete. The work unit task reply may include a pointer or memory/storage identifier that indicates the location of the processed content. For example, the processed content may be stored by a common memory/storage (e.g., databases 210).

With reference to FIG. 6, although the exemplary process is described without mention of notifier 420, according to an exemplary embodiment, notifier 420 may receive and manage notification events during the execution of the work unit task. For example, if an error occurs, notifier 420 may receive an error message. Notifier 420 may route the error message to the appropriate user group. A further description of work unit adapter 274 is provided below.

By way of example, work unit adapter 274 may be deployed in a .NET environment or a Java 2 Platform, Enterprise Edition (J2EE) environment using a service-oriented architecture (e.g., a Web service architecture). Work unit adapters 274 may use various protocols to communicate with network elements 276, such as, for example, Transmission Control Protocol (TCP)/IP, command lines, Web service, etc. DDC service operation management system 240 may allow a DDC operator to install, update, inactivate, rollback, etc., the configuration, the state, etc., pertaining to work unit adapter 274.

As previously described, according to an exemplary embodiment, work unit processor 415 may use network element 276 to execute work unit tasks. Work unit processor 415 may use work unit adapter 274 to, among other things, translate work unit task information, etc., to a format which network element 276 is able to use for and/or during the execution of the work unit task. According to an exemplary embodiment, work unit adapter 274 may monitor network element 276 to, for example, prevent over-allocation, ensure that network element 276 is executing the work unit task at expected levels (e.g., according to a schedule, etc.), and/or provide information (e.g., real-time metrics (e.g., resource metrics, etc.), etc.) to other components of DDC 150 (e.g., work flow command processor 272, DDC resource management system 250, etc.). For example, work unit adapter 274 may obtain real-time status information pertaining to the execution of a work unit task by network element 276.

Work unit adapter 274 may include various interfaces to allow communication with work unit processor 415 and network element 276. For example, work unit adapter 274 may include an interface for a work unit task to use to communicate with work unit adapter 274 and an interface for work unit adapter 274 to use to communicate with the work unit task. According to an exemplary embodiment, work unit adapter 274 may be based on an adapter pattern. For example, the adapter pattern (also known as a wrapper pattern or a wrapper) may correspond to a design pattern that translates one interface for a class or an object into a compatible interface. Work unit adapter 274 may allow classes or objects to work together that normally could not because of incompatible interfaces. Work unit adapter 274 may use various types of adapter patterns (e.g., object adapter pattern, class adapter pattern, etc.).

Figure 7A:
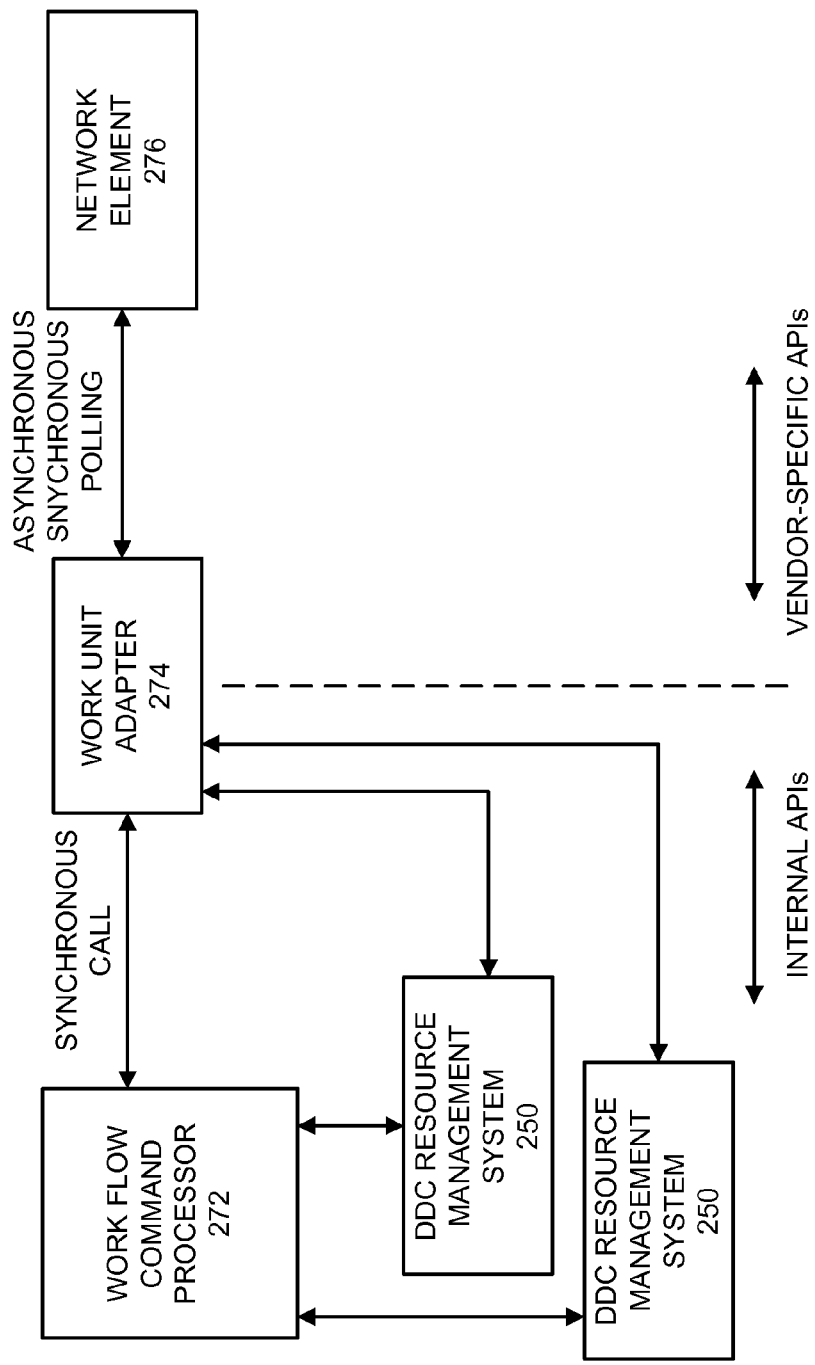
FIGS. 7A-7C are diagrams illustrating an exemplary process for executing a work unit task according to an exemplary embodiment of a work unit adapter.

FIG. 7A is a diagram illustrating an exemplary process in which a work unit task may be executed. According to an exemplary embodiment, work flow command processor 272 may make a synchronous call (e.g., wait for a return, etc.) to work unit adapter 274. In turn, work unit adapter 274 may use polling, synchronous, or asynchronous type of communication to the targeted network element 276. Once the work unit task is completed by network element 276, network element 276 may communicate with work unit processor 415 via work unit adapter 274. For example, network element 276 may send a work unit task reply to indicate that the execution of the work unit task is completed and return control back to work flow command processor 272. Given the synchronous call by work flow command processor 272, the synchronous call may be characterized as a blocked call (e.g., blocking the execution of other code associated with a function, operation, etc., of the work unit task) until the function, operation, line of code, etc., is completed by network element 276. Additionally, since the synchronous call may be considered a blocked call, this process may not include maintaining a co-relation identifier between the synchronous call from work flow command processor 272 to work unit adapter 274.

Figure 7B:
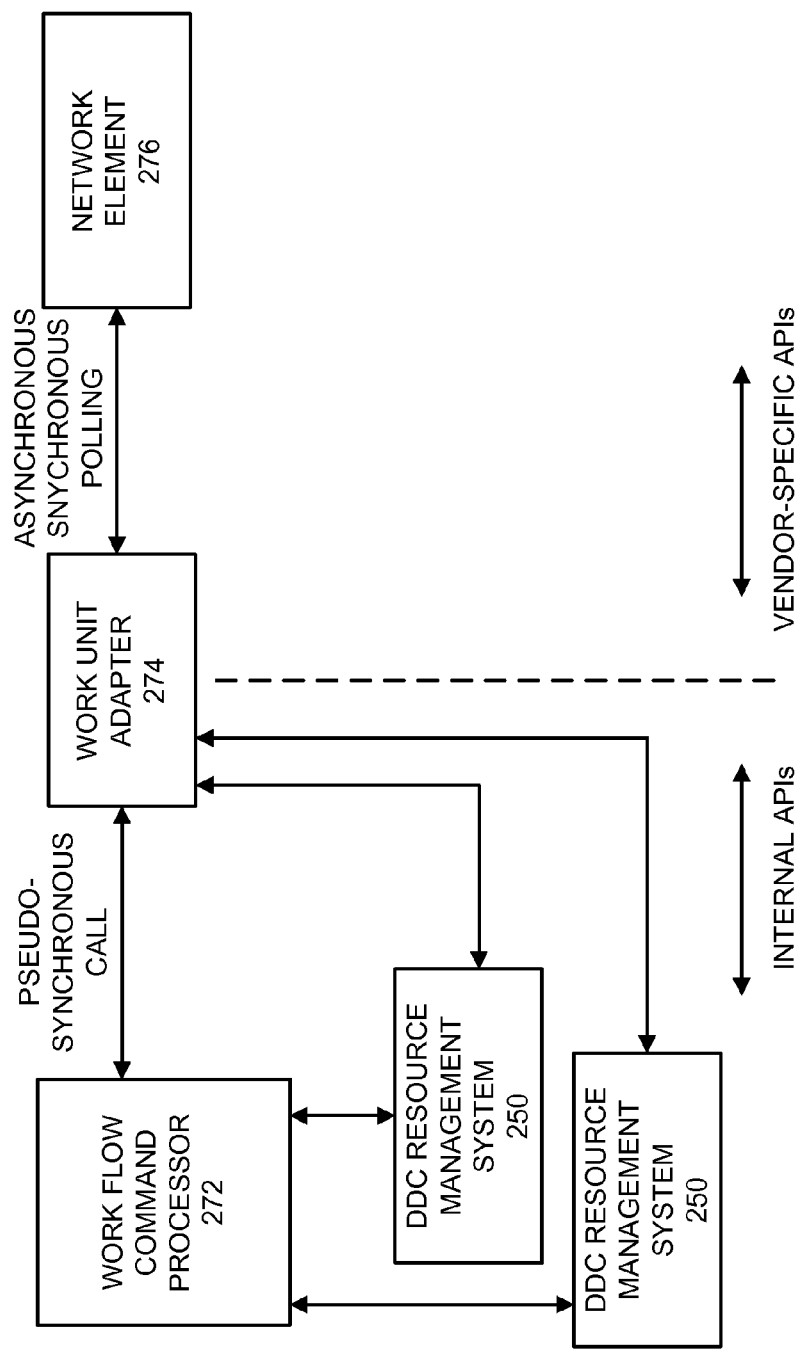

FIG. 7B is a diagram illustrating another exemplary process in which a work unit task may be executed. According to an exemplary embodiment, work flow command processor 272 may make a pseudo-synchronous call to work unit adapter 274. In turn, work unit adapter 274 may use polling, synchronous, or asynchronous type of communication to the targeted network element 276. Once the work unit task is completed by network element 276, work unit adapter 274 may call back work flow command processor 272 to complete the processing. According to such an embodiment, the process may use artifacts (e.g., associated with a runtime engine, such as, WebSphere Process Server (WPS) artifacts, etc.). Additionally, a co-relation identifier between work flow command processor 272 and work unit adapter 274 may not be maintained.

Figure 7C:
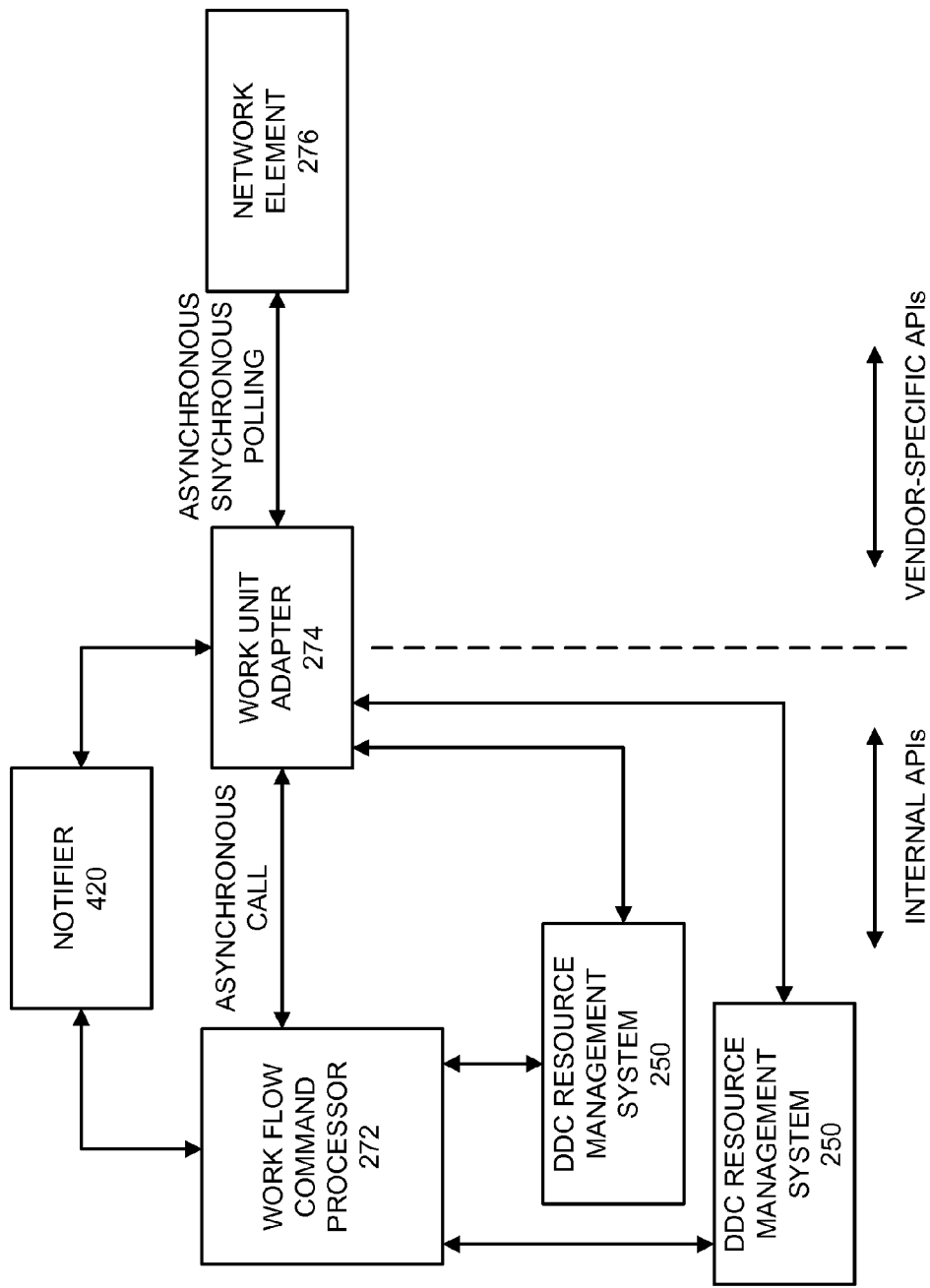

FIG. 7C is a diagram illustrating another exemplary process in which a work unit task may be executed. According to an exemplary embodiment, work flow command processor 272 may make an asynchronous call (e.g., not wait for a return, etc.) to work unit adapter 274. Work unit adapter 274 may use polling, synchronous, or asynchronous type of communication to the targeted network element 276. Once the work unit task is completed by network element 276, work unit adapter 274 may call back notifier 420 and provide a co-relation identifier to complete the processing. According to such an embodiment, notifier 420 may then call back work flow command processor 272 to continue the processing of the work unit task.

As previously described, notifier 420 may receive and manage notification events from processes within DDC 150. Notifier 420 may receive and manage notification events that may occur with respect to processes within DDC 150. Notifier 420 may route notification events to the appropriate user groups or DDC component for resolution. By way of example, the notification events may be categorized as informational, response required, or have a required related resolution action. Notifier 420 may include various functions that pertain to various devices, components, processes, etc., associated with DDC 150. For example, notifier 420 may include functions pertaining to work flow command processor 272, such as, process work order or process work unit. Additionally, notifier 420 may include functions pertaining to work unit adapters 274, such as, process work flow task, collect metrics, store metrics, and summarize metrics. Additionally, notifier 420 may include functions pertaining to DDC resource management system 250, such as, check current capacity, allocate resources, and de-allocate resources.

According to an exemplary embodiment, once a work unit task is submitted to network element 276 via work unit adapter 274, the work unit task may not be terminated or cancelled since this may leave DDC 150 in an unstable state. Rather, according to such an embodiment, network element 276 may attempt to execute the work unit task to completion even if the work order is cancelled. As previously described, network elements 276 may include physical or logical network devices/components for processing content. For example, network elements 276 may include servers or other computing devices to process content.

Figure 8:
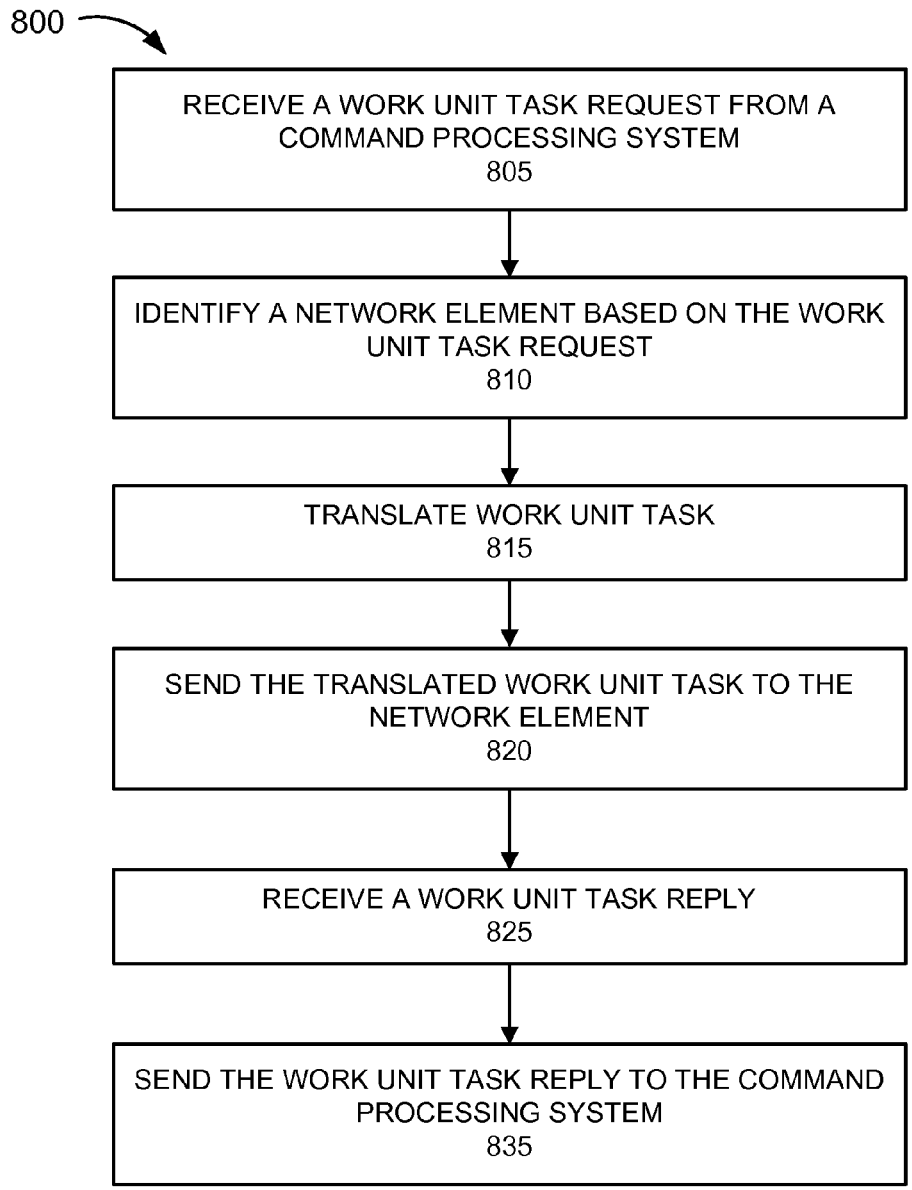
FIG. 8 is a flow diagram illustrating an exemplary process for executing a work unit task according to an exemplary embodiment of a work unit adapter.

FIG. 8 is a flow diagram illustrating an exemplary process for executing a work unit task. According to an exemplary embodiment, process 800 may be performed by work unit adapter 274. Additionally, according to an exemplary embodiment, as previously described, the process for executing the work unit task may include synchronous, asynchronous, and/or pseudo-synchronous calls by work flow command processor 272 (e.g., work unit processor 415).

Process 800 may include receiving a work unit task request from a command processing system (block 805). For example, work unit adapter 274 may receive work unit task information (e.g., work unit definitions, work unit task connector parameters, work order parameters (e.g., start time, quantity, etc.), human intervention parameters, error handling parameters, accounting parameters, storing parameters (e.g., archiving, etc.), and resource information from work unit processor 415. Work unit adapter 274 may also receive other types of parameters, such as, for example, system parameters (e.g., retry parameters, timeout parameters, default parameters, etc.), which may be global, configurable, etc., from work unit processor 415 for the execution of a work unit task. According to other exemplary embodiments, work unit adapter 274 may receive work unit task information and/or other types of parameters from other devices, components, etc., of DDC 150 (e.g., databases 210, etc.).

A network element may be identified based on the work unit task request (block 810). For example, work unit adapter 274 may identifier a network element based on the work unit task request, which may include, for example, a device identifier and/or a network address of network element 276. Work unit adapter 274 may identify the network element based on a function pertaining to the work unit task, a current load based on real-time resource utilization pertaining to network elements, etc.

The work unit task may be translated (block 815). For example, work unit adapter 274 may translate work unit task information, other types of parameters pertaining to the work unit task. According to an exemplary embodiment, work unit adapter 274 may use various types of adapter patterns (e.g., object adapter pattern, class adapter pattern, etc.) to perform the translation of the work unit task.

The translated work unit task may be sent to the network element (block 820). For example, work unit adapter 274 may provide the translated work unit task information, parameters, object, and/or classes pertaining to the work unit task to the appropriate network element(s) 276.

A work unit task reply may be received (block 825). For example, work unit task adapter 274 may receive a work unit task reply from network element 276. For example, the work unit task reply may include a pointer or memory/storage identifier that indicates the location of the processed content, as well as information indicating that the work unit task has been completed. For example, the processed content may be stored by a common memory/storage (e.g., databases 210).

The work unit task reply may be sent to the command processing system (block 835). For example, work unit adapter 274 may send the work unit task reply to work unit processor 415. Work unit adapter 274 may translate any parameters, etc., that may need to be translated on behalf of network element 276 before sending the work unit task reply to work unit processor 415.

Although FIG. 8 illustrates an exemplary process 800 for executing a work unit task, according to other exemplary embodiments, process 800 may include additional operations, fewer operations, and/or different operations than those illustrated and described. For example, process 800 may include error handling and management operations (e.g., if an error occurs when executing the work unit task), and/or other operations pertaining to the processing of a work unit, as described herein.

In the foregoing description, DDC work order execution system 270 may provide for the execution of work orders corresponding to customer orders. Work flow command processor 272 may manage the execution of a work flow, a work unit, a sub-work unit, a micro-work flow, etc., based on various parameters and information associated with work unit tasks, other devices, components, etc., associated with DDC 150, etc. Work unit adapters 274 may provide, among other things, an interface to network elements 276 so that the ingestion, transformation, and distribution of content based a work flow, a work unit, etc., may be executed.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

While a series of blocks has been described with regard to an exemplary process illustrated in FIG. 8, the order of the blocks may be modified according to other embodiments. In addition, non-dependent blocks may be performed parallel. Furthermore, other processes described in this description may be modified and/or non-dependent operations may be performed in parallel.

The exemplary embodiments described herein may be implemented in many different forms of software, firmware, and/or hardware. For example, a process or a function may be implemented as "logic" or as a "component." This logic or this component may include, for example, hardware (e.g., processing system 305, etc.), a combination of hardware and software (e.g., applications 315), a combination of hardware and firmware, or a combination of hardware, firmware, and software. The embodiments have been described without reference to a specific software code, a specific hardware or circuit configuration, etc., since the logic or the component can be designed to implement the embodiments based on the description herein.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction described in the specification and/or drawings should be construed as critical or essential to the exemplary embodiments described herein unless explicitly described as such.

What is claimed is:

1. A method comprising:
    receiving, by a device, a work flow, which when executed, causes at least one of an ingestion of content, a transformation of the content, or a distribution of the content, in accordance with a customer order, wherein the work flow includes one or more work unit tasks for performing the at least one of ingestion, transformation, or distribution of the content;
    retrieving, by the device, work unit task information pertaining to one of the one or more work unit tasks, wherein the work unit task information includes a work unit definition that specifies which of the one or more other work unit tasks are capable of being at least one of an input to the one of the one or more work unit tasks or an output for the one of the one or more work unit tasks and work unit task connector parameters that specify a type of input content and a type of output content for the one of the one or more work unit tasks;
    sending, by the device, the work unit task information to one or more adapters for translation of the work unit task information;
    identifying, by the device, one or more network elements to execute the one of the one or more work unit tasks based on the work unit task information;
    translating, by the device, the work unit task information from a format used by one or more devices to another format that is used by the one or more network elements;
    sending, by the device, the translated work unit task information to the one or more network elements; and
    receiving, by the device, a work unit task completion message from the one or more network elements that indicates that the one of the one or more work unit tasks is completed.

2. The method of claim 1, further comprising:
    receiving real-time time status information pertaining to an execution of the one of the one or more work unit tasks from the one or more network elements; and
    sending the real-time status information status information to the one or more devices.

3. The method of claim 1, wherein the transformation of the content includes at least of creating metadata, converting metadata, splitting the content, adding an advertisement to the content, merging the content with other content, adding close captioning data to the content, transcoding the content, encoding the content, decoding the content, packaging the content, inserting logos or black space into the content, or bundling the content.

4. The method of claim 1, further comprising:
    monitoring the one or more network elements to determine whether an execution of the one of the one or more work unit tasks is being carried out according to a schedule.

5. The method of claim 1, further comprising:
    receiving error handling work unit parameters;
    translating the error handling work unit parameters to the other format; and
    using the error handling work unit parameters to manage the error.

6. The method of claim 1, further comprising:
    receiving, by the one or more adapters, one of a synchronous call, a pseudo-synchronous call, or an asynchronous call pertaining to an execution of the one of the one or more work unit tasks; and
    using one of polling or, synchronous or asynchronous communication to the one or more network elements to obtain a return from the one of the synchronous call, the pseudo-synchronous call, or the asynchronous call.

7. The method of claim 6, wherein when the asynchronous call is received, a co-relation identifier of the asynchronous call is maintained between the one or more adapters and the one or more devices.

8. The method of claim 1, wherein the work unit definition includes at least one of a work unit identifier, a work unit version, or a state that includes one of a new state, a testing state, a tested state, an active state, or an inactive state.

9. The method of claim 1, wherein the work unit task connector parameters include a state parameter that includes one of an in-process state or a complete state, and the method further comprises:
    determining when an execution of the one of the one or more work unit tasks is complete based on the state parameter associated with the output for the one of the one or more work units.

10. A device comprising logic to:
    a transceiver;
    a memory to store instructions; and
    a processor to execute the instructions to:
        receive work unit task information pertaining to a work flow, which when executed, causes at least one of an ingestion of content, a transformation of the content, or a distribution of the content, in accordance with a customer order, wherein the work flow includes one or more work unit tasks for performing the at least one of ingestion, transformation, or distribution of the content, wherein the work unit task information includes a work unit definition that specifies which of the one or more work unit tasks are capable of being at least one of an input to one of the one or more work unit tasks or an output for the one of the one or more work unit tasks and work unit task connector parameters that specify a type of input content and a type of output content for the one of the one or more work unit tasks;
        identify one or more network elements to execute the one of the one or more work unit tasks based on the work unit task information;
        translate the work unit task information from a format used by one or more devices to another format that is used by the one or more network elements;
        send the translated work unit task information to the one or more network elements; and
        receive a work unit task completion message from the one or more network elements that indicates that the one of the one or more work unit tasks is completed.

11. The device of claim 10, wherein when the work unit task information is executed and causes the transformation of the content, the transformation of the content includes at least of creating metadata, converting metadata, splitting the content, adding an advertisement to the content, merging the content with other content, adding close captioning data to the content, transcoding the content, encoding the content, decoding the content, packaging the content, inserting logos or black space into the content or bundling the content.

12. The device of claim 10, wherein when translating the work unit task information, the instructions comprise instructions to:
translate the work unit task information based on at least one of an object adapter pattern or a class adapter pattern.

13. The device of claim 10, wherein the instructions comprise instructions to:
monitor the one or more network elements during an execution of the one of the one or more work unit tasks; and
send real-time resource metric information to the one or more devices based on the monitoring.

14. The device of claim 10, wherein the instructions comprise instructions to:
receive one of a synchronous call, a pseudo-synchronous call, or an asynchronous call pertaining to an execution of the one of the one or more work unit tasks; and
use one of polling or, synchronous or asynchronous communication to the one or more network elements to obtain a return from the one of the synchronous call, the pseudo-synchronous call, or the asynchronous call.

15. The device of claim 14, wherein when the pseudo-synchronous call is completed by the one or more network elements, the instructions comprise instructions to:
generate a call back; and
send the call back to the one or more devices.

16. The device of claim 14, wherein when the asynchronous call is completed by the one or more network elements, the instructions comprise instructions to:
generate a call back that includes a co-relation identifier; and
send the call back to the one or more devices via a notification device.

17. A non-transitory computer-readable medium comprising computer-executable instructions for execution by at least one processor, the instructions causing the at least one processor to:
receive work unit task information pertaining to a work flow, which when executed, causes at least one of an ingestion of content, a transformation of the content, or a distribution of the content, in accordance with a customer order, wherein the work flow includes one or more work unit tasks for performing the at least one of ingestion, transformation, or distribution of the content, wherein the work unit task information includes a work unit definition that specifies which of the one or more work unit tasks are capable of being at least one of an input to one of the one or more work unit tasks or an output for the one of the one or more work unit tasks;
identify one or more network elements to execute the one of the one or more work unit tasks based on the work unit task information;
translate the work unit task information from a format used by one or more devices to another format that is used by the one or more network elements based on one of an object adapter pattern or a class adapter pattern; and
send the translated work unit task information to the one or more network elements.

18. The non-transitory computer-readable medium of claim 17, wherein the instructions further cause the at least one processor to:
monitor the one or more network elements during an execution of the one of the one or more work unit tasks; and
send real-time resource metric information to the one or more devices based on the monitoring.

19. The non-transitory computer-readable medium of claim 17, wherein the instructions further cause the at least one processor to:
receive one of a synchronous call, a pseudo-synchronous call, or an asynchronous call pertaining to an execution of the one of the one or more work unit tasks; and
use one of polling or, synchronous or asynchronous communication to the one or more network elements to obtain a return from the one of the synchronous call, the pseudo-synchronous call, or the asynchronous call.

20. The non-transitory computer-readable medium of claim 17, wherein the distribution of the content includes providing the content to one or more digital media retailers or one or more consumers.

* * * * *